Figure 3:
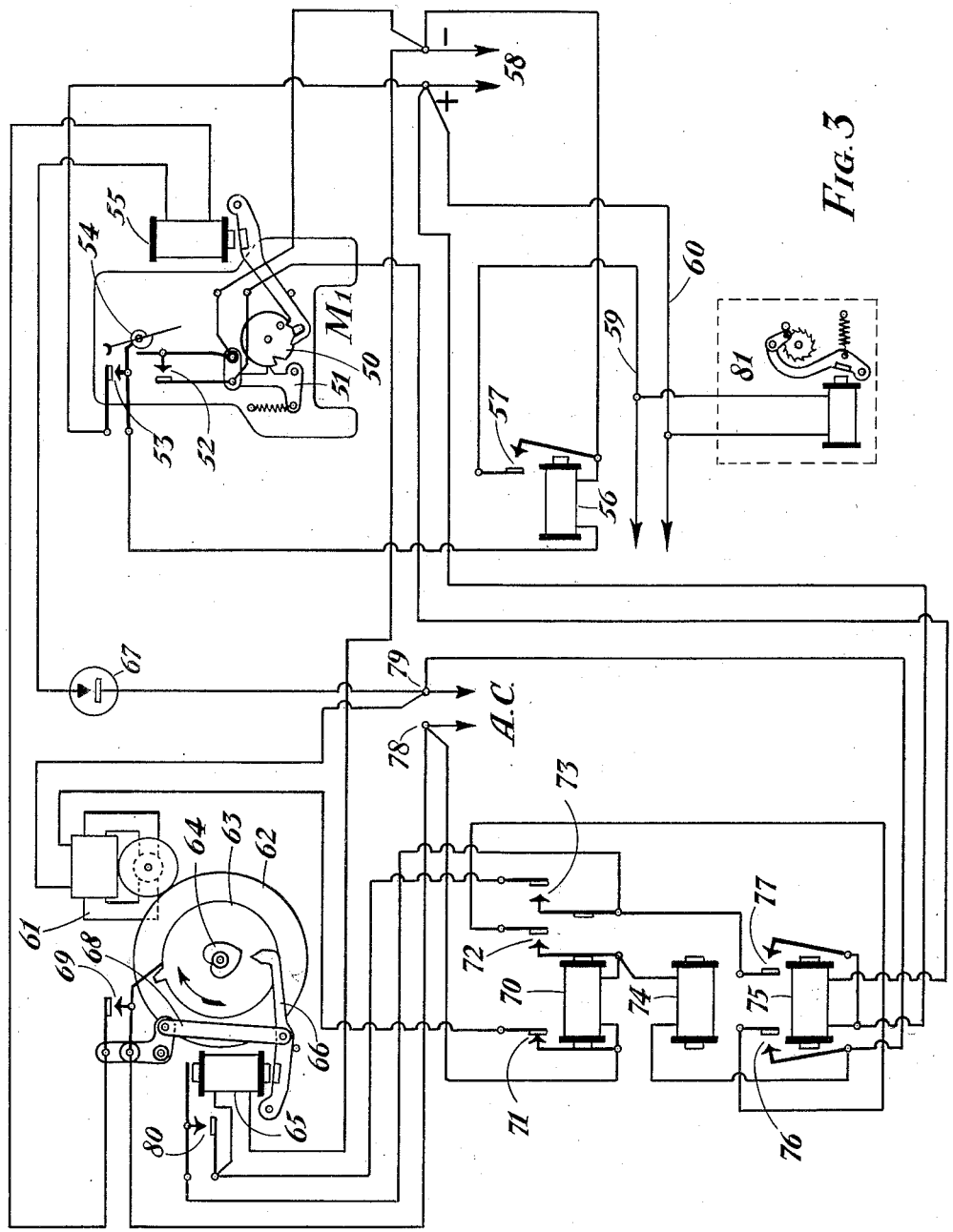

Oct. 28, 1941.  E. S. OSTLER ET AL  2,260,864
TIME CONTROLLED SYSTEM
Filed Oct. 13, 1934  2 Sheets-Sheet 1
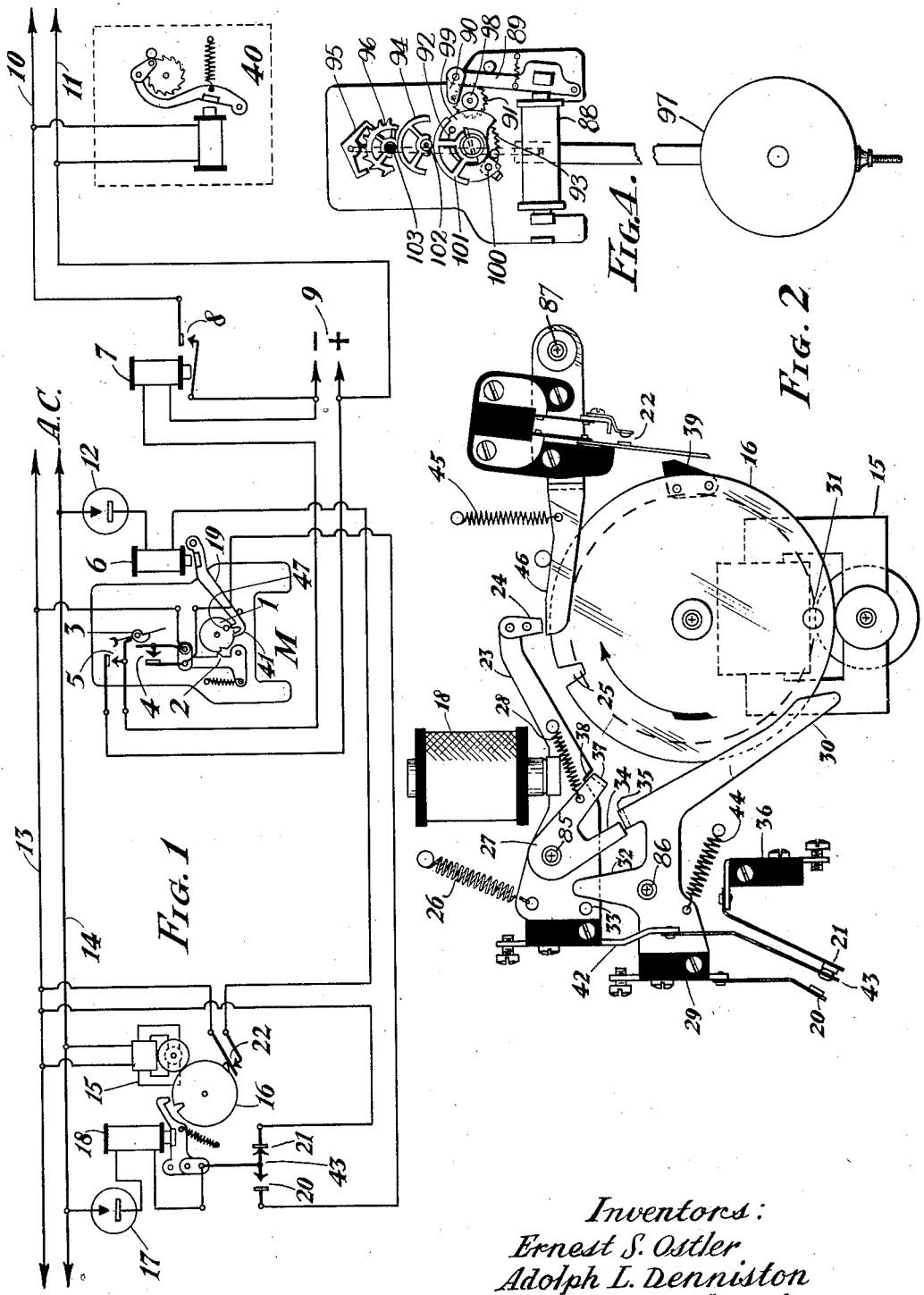
Inventors:
Ernest S. Ostler
Adolph L. Denniston
Clyde S. Richardson
per: H. H. Hulse  Attorney Oct. 28, 1941.     E. S. OSTLER ET AL     2,260,864
TIME CONTROLLED SYSTEM
Filed Oct. 13, 1934     2 Sheets-Sheet 2

Inventors:
Ernest S. Ostler
Adolph L. Denniston
Clyde S. Richardson
per: H. H. Hulse  Attorney Patented Oct. 28, 1941

2,260,864

UNITED STATES PATENT OFFICE 2,260,864

TIME CONTROLLED SYSTEM

Ernest S. Ostler and Adolph L. Denniston, Park Ridge, and Clyde S. Richardson, Harvey, Ill., assignors, by mesne assignments, to General Time Instruments Corporation, New York, N. Y., a corporation of Delaware Application October 13, 1934, Serial No. 748,178

14 Claims. (Cl. 58—24)

The present invention relates in general to time controlled systems and more particularly to the control of a primary or master clock. The main object of the invention is to provide a system in which the primary or master clock is automatically kept in synchronism with correct time, thereby eliminating the necessity of manually checking and setting such clocks.

The invention, is particularly applicable to systems in which a plurality of secondary apparatuses, such as clocks, recorders or time stamps, are controlled by a master clock, such as the well known minute impulse system.

Although the present day master clocks have been developed to a high degree so that they keep remarkably good time, it is necessary that they be periodically checked against correct time and set accordingly in order to insure that the entire system controlled by such clocks is always correct.

According to one feature of the present invention, this routine of manually checking and adjusting the master clock is entirely eliminated, and the master clock is automatically checked, and corrected if it has deviated from correct time, at regular predetermined intervals.

According to another feature of the invention, the primary or master clock is periodically checked and corrected in accordance with a frequency regulated alternating current such as now furnished by nearly all public service companies.

Another feature of the invention relates to the manner in which the master clock is periodically synchronized and in turn periodically checks and synchronizes the synchronizing means to guard against false synchronization in case there has been an interruption in the current supply to the synchronizing means.

According to a further feature of the invention, the synchronizing means, having once been stopped by an interruption in the current supply, can only resume its synchronizing control under control of the master clock.

The above and other objects and features of the invention not specifically mentioned will best be understood from a perusal of the following specification when read in connection with the accompanying drawings, comprising Figures 1 to 4, inclusive, in which—

Figure 1 is a schematic circuit diagram of a time system including one embodiment of the invention;

Figure 2 discloses the mechanical construction required for the control of some of the electrical contacts shown in Figure 1;

Figure 3 is a schematic circuit diagram disclosing a second embodiment of the invention; and Figure 4 is a diagrammatic representation of the master clock showing a spring drive and spring winding mechanism.

Referring in general to the drawings, the time system disclosed in Figure 1 comprises a master clock, indicated at M, which may be of well known, self-winding type, as diagrammatically shown in Fig. 4, having sufficient reserve power to drive the master clock movement from 1 to 192 hours in case current supply to its winding circuit is interrupted. Only the elements necessary for an understanding of the present invention have been shown. The contacts 5 are closed momentarily once each minute by a cam 3 on the seconds arbor, contacts 4 are mounted on a spring pressed lever 2 and arranged to be closed by cam 3 once each hour when the disc I permits the lever 2 to move to the right and bring the contacts into the path of cam 3, and synchronizing magnet 6 controls a mechanical setting arrangement for the minute and second hands of the master clock. As this mechanical construction may assume any one of a number of known hand setting arrangements, it has been diagrammatically indicated by the armature lever 19 having a forked end 41 which engages the pin 47 on the disc I to move it to proper position and thereby set the minute hand. A similar arrangement is provded for the second hand, but this hand setting construction has not been shown in detail so as not to unnecessarily complicate the drawings.

The minute contacts 5 control the operation of relay 7 which transmits impulses over lines 10 and 11 for the time-controlled step-by-step operation of secondary apparatus, such as clocks, recorders, or time stamps, one of which is diagrammatically shown at 40. The current source 9 for the secondary control circuit may be a battery or other suitable uninterrupted source.

The master clock M is periodically synchronized in accordance with a time standard as represented by a frequency regulated alternating current. This means for synchronizing the master clock comprises a timing disc 16 driven by a self-starting synchronous motor 15 connected to the source of frequency regulated alternating current. The motor, disc and associated equipment is best illustrated in Figure 2 of the drawings, a detailed description of which will be given at this point.

Referring to Figure 2, the apparatus is shown in its normal operative position with magnet 18 energized and the synchronous motor 15 driving disc 16 through a friction connection. The disc and motor are coupled so that disc 16 is rotated at the rate of one revolution per hour. Armature lever 23, pivoted at 85, is held against the magnet core, thereby holding contact 43, mounted on contact lever 42 which in turn is rigidly mounted on armature lever 23, in engagement with stationary contact 21 mounted on bracket 36. The lever 29 is held in the position shown by the lateral projection 35 which is abutting against the end of arm 34 of U-shaped lever 27. The latter is pivoted at the same point as armature lever 23 and is normally held in the position shown, with the lateral projection 37 of the U-shaped lever abutting against the shoulder 38 on the armature lever 23, by means of the spring 28.

When magnet 18 releases, finger 24 on the armature lever 23 drops to the periphery of disc 16, due to the action of spring 26, and swings lever 46 about its pivot 87, thereby moving contacts 22 out of the path of cam 39 mounted on the disc. This movement of armature lever 23 also moves the contact 43 out of engagement with contact 21 but the armature does not move sufficiently to allow contacts 43 and 20 to close. When the disc has revolved to the proper position, the finger 24 drops into notch 25 and holds the disc against further rotation. This movement of armature lever 23 moves contact 43 into engagement with contact 20 and also allows the lateral projection 35 on lever 29 to slide free of the end of arm 34.

When magnet 18 is again operated in a manner to be explained later in connection with the detailed explanation of the operation of the embodiment shown in Figure 1, the armature lever is attracted to the magnet core and lifts finger 24 from the notch 25 allowing the disc 16 to be rotated by the motor. Contact 43 is moved into engagement with contact 21 but also maintains its contact with contact 20 since lever 29 is moved about its pivot 86 (projection 35 now being clear of the end of arm 34) by spring 44 until the projection 32 abuts against the stop pin 33. Contact 43 is now in engagement with both contacts 20 and 21. In this position of lever 29, the arm 30 lies in the path of pin 31 mounted on disc 16.

As the disc continues to rotate, pin 31 will engage arm 30 and force it to the left. The U-shaped lever 27 will be moved about its pivot 85 against the action of spring 28 until the projection 35 is free of the end of arm 34 when it will snap back to its normal position. The movement of arm 30 to the left swings lever 29 about its pivot 86 and carries contact 20 out of engagement with contact 43. Lever 29 will be held in this position by the projection 35 which is again abutting against the end of arm 34. When the armature lever 23 was raised by the energization of magnet 18, spring 45 again moved lever 46 about its pivot 87 to a position against the stop pin, thereby bringing contacts 22 into the path of cam 39.

From the foregoing it will be seen that contacts 20, 21 and 43 operate in a sequence of four steps, that is, contact 43 is first moved out of engagement with contact 21; second, contact 43 is moved into engagement with contact 20; third, contacts 43 and 20 are moved together until contact 43 engages contact 21, all three contacts being electrically connected at this time; and fourth, contact 20 is moved out of engagement with contact 43 leaving contacts 43 and 21 in engagement.

The master clock M may be of the pendulum type as diagrammatically shown in Fig. 4. The clock comprises the usual pendulum 97, verge 95, escapement wheel 96, and intermediate gears 94 and 101 and pinions 102 and 103 transmitting power from the main spring 92 to the escapement wheel. The spring 92 is kept wound by the winding magnet 88 by means of armature 89 carrying pawl 90 which engages the teeth of ratchet wheel 91. Movement of the ratchet wheel is transmitted to the spring drum 99 through pinion 98. Stop pawl 100, mounted on drum 99, engages the teeth of ratchet 93, fixedly mounted on the clock frame, to prevent backward movement of the spring drum. The outer end of spring 92 is connected to drum 99 and the inner end is fastened to the shaft on which is mounted the gear 101. This driving and self-winding arrangement is well known in the art and need not be explained in greater detail.

Having given a general description of the apparatus shown in Figures 1 and 2 of the drawings, a detailed explanation of the operation of this embodiment of the invention, as illustrated by Figure 1, will now be given.

Referring to Figure 1 of the drawings, the master clock M is driven by its spring movement which is kept wound by a suitable self-winding arrangement such as is shown in Fig. 4. Once each minute the contacts 5 are momentarily closed by cam 3 to complete the circuit of relay 7. Relay 7, at contacts 8, transmits an impulse to the secondary apparatus, such as 40, over lines 10 and 11. This operation is common to minute impulse systems and is so well known that it requires no detailed showing or explanation.

The synchronous motor 15 is driven from a source of frequency regulated alternating current over lines 13 and 14 and drives the timing disc 16 by means of a slip friction clutch and suitable gearing so that disc 16 is driven at the rate of one revolution per hour. Once each hour, at 59 minutes 30 seconds after the hour in the assumed case, cam 39 closes contacts 22 thereby energizing magnet 6 over a circuit extending from power line 13, contacts 22, winding of magnet 6, rectifier 12, to line 14. Magnet 6 energizes and by means of the mechanical hand setting construction, indicated at 19, sets the minute and second hands of the master clock. The time for such synchronization has been chosen at a half minute period so that the moving of the second hand will not cause a false minute impulse to be transmitted to the secondary apparatus. Thus it is apparent that the master clock will be kept in synchronism with correct time as represented by the frequency regulated alternating current. Nearly all power companies are now regulating the frequency of their alternating current so that synchronous motor clocks driven thereby indicate correct time, the frequency being regulated by means of a time standard.

The magnet 18 is normally energized from the power supply lines over a circuit including line 13, contacts 21 and 43, winding of magnet 18, rectifier 17, to line 14. In case of an interruption in the current supply, magnet 18 releases and the synchronous motor stops. The release of magnet 18 allows the finger 24 (Fig. 2) to drop to the periphery of disc 16 and moves contact 43 out of engagement with contact 21, thereby preventing the reenergization of magnet 18 when current flow is resumed.

As the alternating current may be interrupted at any time during the hour and may be off for varying periods, it is necessary that the timing disc 16 must first be correctly synchronized or set in proper relation to master clock time before it can be allowed to resume its synchronizing control of the master clock. If this were not done, and assuming a case in which the duration of the interruption was five minutes, the timing disc, after being restarted, would send its synchronizing impulse to the master clock at five minutes after the hour and the master clock would be set to incorrect time.

When current flow is resumed after an interruption, the synchronous motor starts and revolves disc 16 until the finger 24 drops into the notch 25. While the disc is rotating, the contacts 22 are out of the path of cam 39 so that a false synchronizing impulse will not be transmitted to the master clock. The finger 24 engaging notch 25 holds the disc against further rotation although the motor continues to run. The movement of armature lever 23 when the finger drops into the notch carries contact 43 into engagement with contact 20, thereby preparing an operating circuit for magnet 18.

The disc 16 is held against rotation until the master clock reaches the succeeding hour. In this position, contacts 4 are moved into the path of cam 3 by the spring pressed lever 2 and are closed when the second hand reaches its zero position. The closing of contacts 4 completes a circuit from line 13, contacts 4, contacts 20 and 43, winding of magnet 18, rectifier 17, to line 14. Magnet 18 energizes and attracts its armature lever 23, thereby releasing the disc 16 so that it is again revolved by motor 15. Contacts 43 and 20 are moved into engagement with contact 21 thereby completing the above traced normal holding circuit for the magnet over contacts 43 and 21. Contact 20 is moved out of engagement with contact 43 when arm 30 is forced to the left by pin 31 as previously explained in connection with Figure 2. The attraction of armature lever 23 also allows lever 46 to assume its normal position with contacts 22 in position to be operated by cam 39.

From the foregoing it is seen that after an interruption in the current supply, the timing or synchronizing disc will be revolved to its "zero" position and held until released at the proper time by the master clock. Thus the cam 39 will be properly positioned so that it will close contacts 22 at the correct time for the succeeding synchronization or setting of the hands of the master clock. By this arrangement, the timing disc cannot send out a false synchronizing impulse to the master clock since its synchronizing means is disabled until it has been set in proper time relation with the master clock.

The embodiment shown in Figure 3 of the drawings includes a master clock M1 which is similar in all respects to the master clock M of Figure 1, contacts 53 being the minute contacts operated by cam 54, contacts 52 being operated once each hour by cam 54 when the notch in disc 50 permits lever 51 to move to the right thereby moving the contacts into the path of the cam, and magnet 55 being the synchronizing magnet which controls the setting of the minute and second hands. Relay 56 is controlled by minute contacts 53 and transmits the operating impulses to the secondary apparatus over lines 59 and 60. The synchronous motor 61 revolves disc 62 at the rate of one revolution per hour by means of a friction drive. Contacts 69 are operated once each hour by cam 63. Magnet 65 controls a synchronizing lever 66 which acts on the heart-shaped cam 64 to set the timing disc 62 and cam 63 when the magnet is energized. The lever 68, pivotally mounted on lever 66, moves contacts 69 out of the path of cam 63 during the setting operation. Relays 70 and 75 and impedance coil 74 have functions in the control of the synchronous motor as will appear hereinafter in the detailed explanation of this embodiment of the invention.

Referring now to the detailed operation of the embodiment disclosed in Figure 3 of the drawings, the timing disc 62 is revolved at the rate of one revolution per hour as stated above. Rotating with disc 62 is a cam disc 63 which closes contacts 69 once each hour, which may preferably be at about 59 minutes and 30 seconds after the hour. The closing of contacts 69 completes a circuit from line 78, contacts 69, winding of magnet 55, rectifier 67, to line 79. Magnet 55 energizes and effects the mechanical setting of the minute and second hands of the master clock in well known manner.

The normal operating circuit for the synchronous motor 61 is from line 78 of the A. C. supply source, contacts 71, winding of motor 61, to line 79 of the A. C. source. The relay 70 is normally held operated over a circuit extending from line 78, winding of relay 70, impedance coil 74, to line 79. The continued energization of relay 70 maintains the motor circuit closed at contacts 71. When current flow from the A. C. source is interrupted, relay 70 releases and motor 61 stops. The release of relay 70 opens the motor circuit at contacts 71, prepares an operating circuit for itself at contacts 72, and prepares a circuit for magnet 65 at contacts 73.

When current flow is resumed in the supply lines 78 and 79, relay 70 is in series with the impedance coil 74 and cannot operate due to the high resistance of the coil. Thus the motor cannot start until a starting impulse is received from the master clock. Shortly before the half hour period, as assumed for the purpose of explanation, disc 50 allows lever 51 to move contacts 52 into the path of cam 54. When the contacts 52 are closed a circuit is completed from one side of current source 58, contacts 52, winding of relay 75, to the other side of current source 59. Relay 75 operates and at contacts 77 completes a circuit to the synchronizing magnet 65 extending from one side of the current source, contacts 77, contacts 73, winding of magnet 65, to the other side of the current source 58. Magnet 65 operates and its armature lever 66 acts on the heart shaped cam 65, rotating the cam 63 to its "zero" position. This is possible since the disc 62 is connected to motor 61 by a slip friction drive. Lever 68 moves contacts 69 out of the path of cam 63 during the setting operation to prevent the sending of a false synchronizing impulse to the master clock and to prevent damage to the contacts in case the cam is moved counterwise to the contacts. Magnet 65 also completes a locking circuit for itself at contacts 80 independent of contacts 73 of relay 70.

Relay 75, in operating, also closes contacts 76, thereby shunting out the impedance coil 74 over contacts 72 and bridging relay 70 directly across the A. C. lines 78 and 79. Relay 70 operates and at contacts 71 completes the circuit to motor 61 which now starts. At contacts 72 it opens the shunt around impedance coil 74, thereby connecting the coil in series with the relay winding. Although relay 70 will not operate in series with coil 74, it will hold up in series with the coil after having once been operated. At contacts 73, relay 70 opens the operating circuit of magnet 65 but this magnet is now held energized over the above-traced locking circuit. In order to insure the operation of magnet 65 and the completion of its locking circuit before its operating circuit is opened at contacts 73, these contacts can be adjusted to open last upon operation of relay 70, or relay 70 can be made slightly slow to operate.

Thus the timing disc is held by magnet 65 until the end of the synchronizing impulse which occurs on the break of contacts 52 when the master clock second hand reaches its zero position. The motor 61 starts as soon as relay 70 operates and removes all back lash in the gearing occasioned by the setting of disc 62 by magnet 65. Upon the break of contacts 52, relay 75 releases and at contacts 77 opens the locking circuit of magnet 65. Magnet 65 releases and allows the timing disc to be again rotated by the motor, the release of the disc being timed by the master clock so that the succeeding synchronizing signal will be sent to the master clock at the correct time by the closing of contacts 69 by cam 63.

From the foregoing detailed explanation of the two embodiments of the invention, it will be seen that the master clock which controls the time system is periodically synchronized with correct time as represented by a frequency regulated alternating current. The master clock has reserve power to carry it over any interruptions in current to its winding circuit and, upon resumption of current flow, the timing disc which periodically synchronizes the master clock is first set in synchronism with master clock time before it can resume its synchronizing control. Thus all the advantages of the minute impulse time system are retained and at the same time the routine of manually checking and setting the master clock is eliminated.

Two embodiments of the invention as applied to a minute impulse time system have been disclosed and described herein but other embodiments and modifications thereof will be apparent to those skilled in the art. Furthermore the invention is not limited to a minute impulse system but may be used with any self-contained or self-powered, spring or weight driven clock. It is the intention, therefore, that the invention be limited only by the prior art and the scope of the appended claims.

The term "primary" clock as used in the specification and in the appended claims covers any clock which is self contained and self-driven, either by spring power or by weights, that is, any clock which is not a secondary clock in a system and controlled from a master clock.

It is also to be understood that the terms "synchronizing" and "synchronization" as used in the foregoing specification and in the appended claims include the setting of an apparatus to a particular position as determined by the position of a second apparatus or in accordance with an accepted standard. Thus the terms as used include the periodic setting of the hands of the clock so that it is kept in step with and indicates the same time as the time standard used to control the frequency of the alternating current.

Having described the invention, what is new and is desired to have protected by Letters Patent is:

1. In combination, a clock, a source of frequency regulated alternating current and a synchronous motor operated thereby, means controlled by said motor for periodically synchronizing said clock, and means controlled by said clock and operative only after current has been restored following an interruption in current from said source for synchronizing said motor-controlled synchronizing means.

2. In combination, a clock, a source of current and a motor operated thereby, a rotating disc controlled by said motor, and means controlled by said clock and operative only when said clock is in one of several different predetermined chronological positions for synchronizing said disc only when current has been restored following an interruption in said current.

3. In combination, a source of frequency regulated alternating current and a self starting synchronous motor operated thereby, a timing disc rotated by said motor, a friction drive connection between said disc and said motor, and means effective when said motor is restarted after an interruption in said current for stopping said disc in a particular predetermined position.

4. In combination, a clock, a source of regulated alternating current and a self starting synchronous motor operated thereby, a timing disc controlled by said motor, means effective when said motor is restarted after an interruption in said current for stopping said disc in a particular predetermined position, and means controlled by said clock for releasing said disc.

5. In combination, a master clock, a source of current and a motor operated thereby, a timing disc driven by said motor, means controlled by said disc for periodically synchronizing said master clock, means responsive to an interruption and succeeding resumption of current flow from said source to said motor for locking said disc in a particular predetermined position, and means controlled by said master clock for releasing said disc at the proper time so that it is in proper synchronism with said master clock to resume its periodic synchronizing thereof.

6. In combination, a clock, a source of current and a motor driven thereby, means controlled by said motor for periodically synchronizing said clock, means responsive to an interruption in current from said source for preventing the restarting of said motor upon resumption of current flow, and means controlled only by said clock for restarting said motor.

7. In combination, a clock, a source of current and a timing disc chronologically controlled thereby, means controlled by said disc for periodically synchronizing said clock, means controlled by said clock for periodically setting said timing disc to a predetermined position effective only when current has been restored following an interruption of current which has occured since the previous setting period, and means for preventing said disc from exercising its synchronizing control on said clock during said setting operation.

8. In combination, a clock, a source of current and a motor operated thereby, a timing disc driven by said motor, means controlled by said disc for periodically synchronizing said clock, means effective upon cessation of current flow from said source to said motor for rendering said motor inoperative, means operative upon the resumption of current flow for rotating said disc to a particular predetermined position, means for preventing said disc from exercising its synchronizing control on said clock during such rotation and means controlled only by said clock for restarting said motor.

9. In combination, a clock, a source of frequency regulated current and a timing disc revolved thereby, means controlled by said disc for periodically synchronizing said clock, means for locking said disc in a predetermined position, and means for rendering said locking means ineffective as long as the current flow from said source is uninterrupted.

10. In combination, a clock, a source of current and a motor operated thereby, a timing disc having a frictional connection with said motor, means controlled by said disc for periodically synchronizing said clock, locking means for said disc placed in operative position by an interruption in the current flow from said source, said means effective to lock said disc in a predetermined position when current flow to said motor is resumed and said disc has been revolved to said position, and means controlled by said clock for rendering said locking means ineffective and again placing it under control of said current.

11. In combination, a clock movement, a source of current and a motor operated thereby, means controlled by said motor for periodically setting said clock movement to a predetermined chronological position, and means controlled by said clock movement and effective only in a predetermined chronological position thereof for restarting said motor following an interruption in current.

12. In combination, a clock movement, a source of current and a motor operated thereby, a timing disc driven by said motor, means controlled by said disc for periodically setting said clock movement, and means controlled only by said clock movement when in a predetermined chronological position and effective following an interruption in current for setting said disc to a particular predetermined position and for thereafter restarting said motor.

13. In combination, a clock, a source of frequency regulated alternating current and a synchronous motor driven means operated thereby, means for periodically synchronizing the clock with said motor driven means, means for rendering said last named means inoperative following an interruption in current, means for synchronizing said motor driven means with said clock operative only at predetermined times and only after current has been restored following an interruption and for again rendering said clock synchronizing means operative.

14. In combination, a clock, a source of current and a motor driven thereby, a rotating element driven by said motor, means responsive to an interruption of current flow from said source for preventing the restarting of said motor when current flow is resumed, and means controlled by said clock following such interruption for setting said element to a particular predetermined position and for thereafter restarting said motor.

ERNEST S. OSTLER.
ADOLPH L. DENNISTON.
CLYDE S. RICHARDSON.